(12) United States Patent
Verger et al.

(10) Patent No.: US 8,151,461 B2
(45) Date of Patent: Apr. 10, 2012

(54) METHOD FOR PRODUCING A THREADED TUBULAR CONNECTION SEALED BY RADIAL EXPANSION

(75) Inventors: Eric Verger, Gommegnies (FR); Laurent Dubedout, Valenciennes (FR); Benoît Duquesne, Valenciennes (FR); Andréi G Filippov, Rijswijk (NL); Scott A Benzie, Rijswijk (NL)

(73) Assignee: Vallourec Mannesmann Oil & Gas France, Aulnoye-Aymeries (FR)

( * ) Notice: Subject to any disclaimer, the term of this patent is extended or adjusted under 35 U.S.C. 154(b) by 1294 days.

(21) Appl. No.: 10/548,071

(22) PCT Filed: Mar. 4, 2004

(86) PCT No.: PCT/EP2004/002196
§ 371 (c)(1),
(2), (4) Date: Sep. 6, 2005

(87) PCT Pub. No.: WO2004/079246
PCT Pub. Date: Sep. 16, 2004

(65) Prior Publication Data
US 2006/0162145 A1    Jul. 27, 2006

(30) Foreign Application Priority Data
Mar. 7, 2003  (FR) .................................... 03 02882

(51) Int. Cl.
*B21D 39/00* (2006.01)
*B21D 51/16* (2006.01)
*B23P 11/00* (2006.01)
*B23P 11/02* (2006.01)
*F16L 13/14* (2006.01)

(52) U.S. Cl. ......... 29/890.14; 29/437; 29/522.1; 29/523

(58) Field of Classification Search ................. 29/522.1, 29/523, 525.11, 525.14, 890.14, 450, 437; 166/207; 285/333, 334, 343, 382.4, 382.5, 285/390, 382.1, 382.2, 382.7, 382
See application file for complete search history.

(56) References Cited

U.S. PATENT DOCUMENTS

| 418,752 | A | * | 1/1890 | Rogers ....................... 285/381.1 |
| 4,730,857 | A | | 3/1988 | Schwind |
| 5,154,452 | A | | 10/1992 | Johnson |
| 5,462,315 | A | | 10/1995 | Klementich |
| 6,322,110 | B1 | * | 11/2001 | Banker et al. ................. 285/334 |
| 6,607,220 | B2 | * | 8/2003 | Sivley, IV ..................... 285/334 |
| 6,619,696 | B2 | * | 9/2003 | Baugh et al. ................... 285/92 |
| 7,086,669 | B2 | * | 8/2006 | Evans et al. ................. 285/382.2 |

FOREIGN PATENT DOCUMENTS
WO        02/01102       1/2002

OTHER PUBLICATIONS
U.S. Appl. No. 12/683,780, filed Jan. 7, 2010, Verger, et al.

* cited by examiner

*Primary Examiner* — Alexander P Taousakis
(74) *Attorney, Agent, or Firm* — Oblon, Spivak, McClelland, Maier & Neustadt, L.L.P.

(57) ABSTRACT

To produce a sealing contact between male and female threaded elements, a contact zone is provided, located between male and female threading portions separated from each other in an axial direction. The male and female elements have respective cylindrical portions that extend over the entire length of the contact zone. After expansion, a sealing contact is established between surfaces in two annular areas by a radial interference fit.

26 Claims, 3 Drawing Sheets

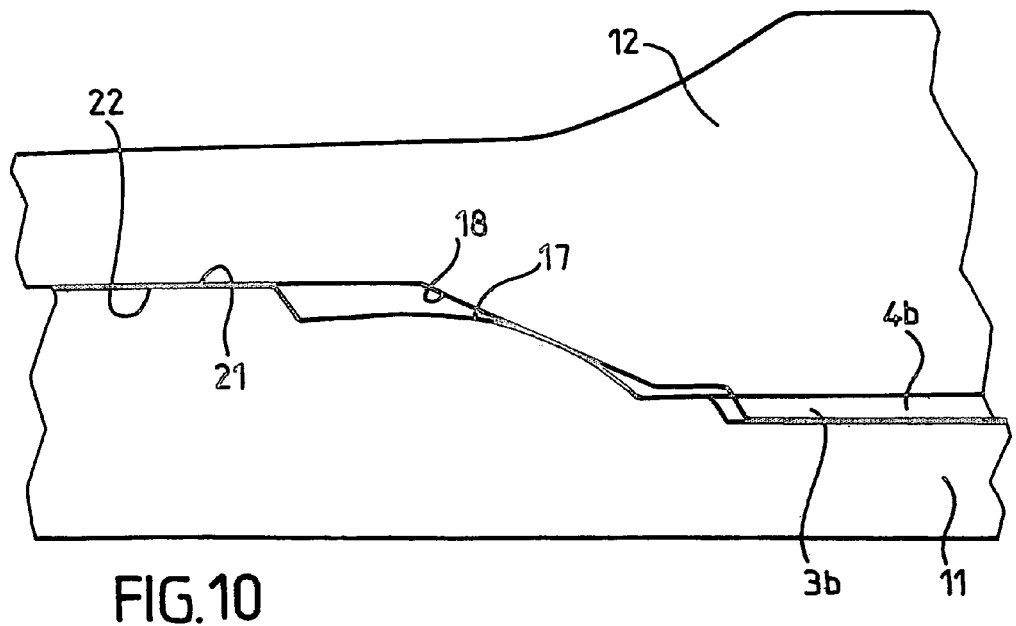
FIG.10
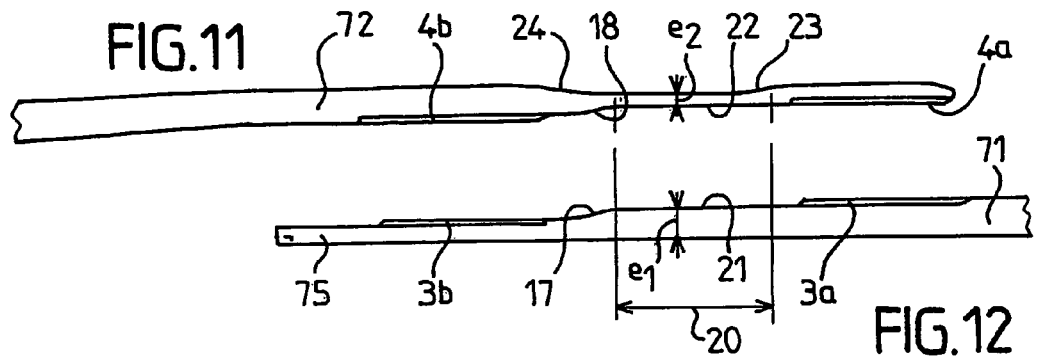
FIG.11
FIG.12
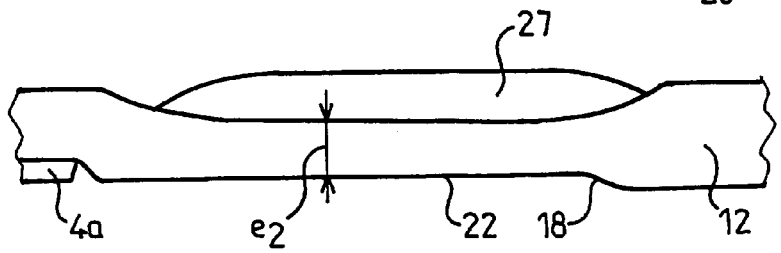
FIG.13
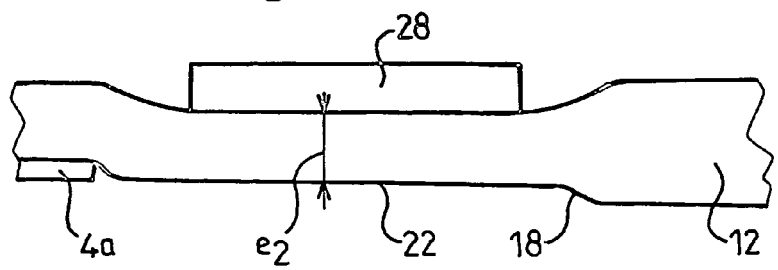
FIG.14

METHOD FOR PRODUCING A THREADED TUBULAR CONNECTION SEALED BY RADIAL EXPANSION

The invention relates to a method for producing a sealed threaded tubular connection starting from an initial threaded tubular connection comprising:
- a first male tubular element comprising a first male threading; and
- a second female tubular element comprising a second female threading, homologous with the first threading;

making the first threading up into the second threading to bring the two elements into a connected position, and subjecting the initial threaded tubular connection to a diametral expansion in the region of plastic deformations using an expansion tool with a diameter that is greater than the internal diameter of said tubular elements, which is axially displaced in the connection.

That type of threaded connection is particularly intended for use in producing strings for hydrocarbon or the like wells.

International patent application WO-A-02/011002 discloses a method of the type under consideration, in which the first and second axial abutment surfaces belonging respectively to a male lip at the free end of the male element and to a corresponding female housing nest in each other, the male lip and the female housing being conformed such that their peripheral surfaces come into mutual sealing contact after expansion.

That known method is satisfactory up to a degree of expansion of the order of 15%, a degree of expansion of x % corresponding to a ratio (100+x)/100 between the diameter of the expansion tool which is a ball and the internal diameter of the tubular elements prior to expansion. However, for higher expansions, the deformation is such that the lip completely leaves the housing, so that the sealing contact is no longer guaranteed.

The invention aims to provide a method that can produce a sealed connection after expansion to higher degrees than those allowed by the prior art.

The invention also aims to improve contact pressures for a given degree of expansion and to reduce the sensitivity thereof to the degree of expansion and to geometric variations in the expansion tool due to its wear during expansion operations over great lengths, and to the use of different tools from one operation to another.

In the present document the meaning of the term "expansion tool" is not limited to tools in the shape of balls but also includes rotative tools such as the three-roll tools disclosed in documents WO 02/081863, U.S. Pat. No. 6,457,532 and U.S. 2002/0139540.

The invention still further aims to obtain a seal both to external pressure and to internal pressure, and a seal prior to expansion, advantageously to gas.

Additionally, the invention aims to obtain substantially the same sealing characteristics whether the expansion tool is displaced from the male element towards the female element or vice versa, thus eliminating an obstacle to using coupled connections.

Still further aims consist of stabilizing the contact regardless of the load, and of placing the sealing zone in a region that is relatively protected from shocks during manipulations.

In particular, the invention provides a method of the type defined in the introduction, and is characterized in that each of the first and second threadings is separated into two portions separated from each other in an axial direction and in that, in a contact zone extending over a fraction of the length of the connection included between said threading portions, the male and female elements have smooth surfaces facing radially outwardly and inwardly respectively, which fit one into the other over the entire axial length of said contact zone during makeup, means being provided to endow the female element in the contact zone with a spring back displacement after expansion that is greater than that of the male element, to establish local sealed contact by a radial interference fit between said smooth surfaces.

Optional complementary or substitutional characteristics of the invention are as follows:
- said smooth surfaces are cylindrical and slide freely one in the other;
- the radial thickness of the female element and the male element is constant over the entire length of said contact zone;
- the diametral clearance between said smooth surfaces is in the range 0.1 to 0.8 mm;
- said sealing contact by a radial interference fit is established in at least two annular areas distributed over said contact zone;
- the radial thickness $e_2$ of the female element in said contact zone is reduced with respect to its thickness in the area of the threading portions;
- the ratio between the minimum radial thickness $e_2$ of the female element in said contact zone and the radial thickness $e_1$ of the facing male element is in the range 0.25 to 0.7;
- said ratio is in the range 0.35 to 0.5;
- the radial thickness of the female element increases progressively in two transition zones located respectively either side of said contact zone;
- the zone of reduced thickness of the female element is at least partially filled with a material with a lower Young's modulus and/or a higher yield strength than the female element;
- the reduced thickness of the female element is surrounded by a ring formed from a material with a lower Young's modulus and/or a higher yield strength than the female element;
- the first tubular element and the second tubular element respectively form part of a great length tube and of a coupling intended to connect it to a further great length tube via a second threaded tubular connection also obtained by the method of the invention;
- the coupling is formed from a material that differs from that of the great length tube by having a lower Young's modulus and/or a higher yield strength;
- the first tubular element and the second tubular element respectively belong to two great length tubes;
- the ratio between the radial thickness $e_1$ of the male element in said contact zone and the radial thickness of the great length tube or tubes over the majority of their length is in the range 0.4 to 0.8;
- the male and female tubular elements respectively have first and second axial abutment surfaces which come into mutual contact at the end of makeup;
- the first tubular element has at its free end an annular lip having said first axial abutment surface constituted by an annular tongue and by a transverse surface adjacent to said tongue and axially set back with respect thereto, connected to the internal peripheral surface of the first element, and the second tubular element has a housing, homologous with the male lip, having said second axial abutment surface constituted by an annular groove and by a transverse surface adjacent thereto, connected to the internal peripheral surface of the second element, the tongue cooperating with the groove the inwardly radially facing peripheral surface of the housing comprises an annular channel with a concavely arched profile, which has a first flank facing axially towards said axial abutment surfaces and a second flank facing axially opposite to said axial abutment surfaces, an inclined shoulder of the housing defined by said first flank, and an inclined shoulder facing axially opposite to said axial abutment surfaces, formed on the peripheral surface of the radially outwardly facing male lip, undergoing an axial displacement relative to each other during radial expansion to come into mutual sealing contact with a radial interference fit;

the first and second threadings are tapered with a taper of at most 12.5%;

the threading portions of each element are located along a common tapered surface;

the first and second threadings are straight, the two portions of each threading having different diameters;

the mating surfaces are provided on the male and female elements to ensure a sealing contact by a radial interference fit between said mating surfaces prior to expansion;

said mating surfaces are located in the vicinity of the free end of the male element;

each of said mating surfaces is located between said contact zone and the threading portion of the corresponding element that has the smallest diameter;

the degree of expansion is in the range 10% to 30%;

the degree of expansion is in the range 15% to 25%;

The invention also concerns a threaded tubular connection as obtained by the method defined above.

The threaded tubular connection of the invention comprises a first male tubular element comprising a first male threading and a second female tubular element comprising a second female threading into which the first threading is made up, each of the first and second threadings being separated into two portions separated from each other in an axial direction, the female element having, in a contact zone extending over a fraction of the length of the connection included between said threading portions, a radial thickness that is reduced with respect to its thickness in the area of the threading portions, the male and female elements having respective surfaces facing radially towards each other over the entire axial length of said contact zone, between which a sealed contact is locally established by a radial interference fit.

The characteristics and advantages of the invention will be explained in detail in the following description, made with reference to the accompanying drawings.

FIG. 10 shows a variation of the male and female surfaces intended to form a seal prior to expansion.

FIGS. 11 and 12 are analogous views to FIGS. 1 and 2 respectively, relating to a further implementation of the invention.

FIGS. 13 and 14 are details of variations in the reduced thickness portion of the female element.

Figure 1:
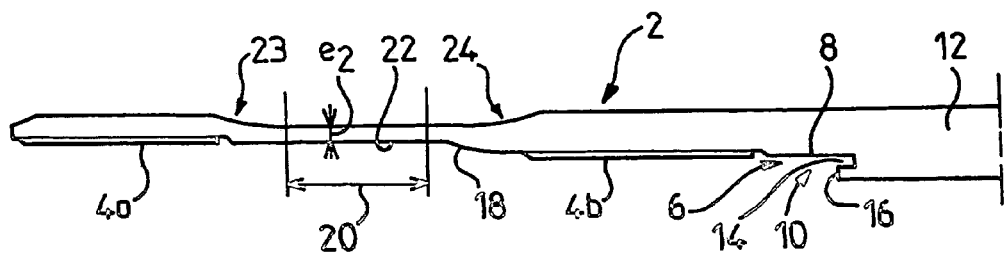
FIGS. 1 and 2 are axial cross sectional half views of a female tubular element and a male tubular element intended for use in the method of the invention.
Figure 2:
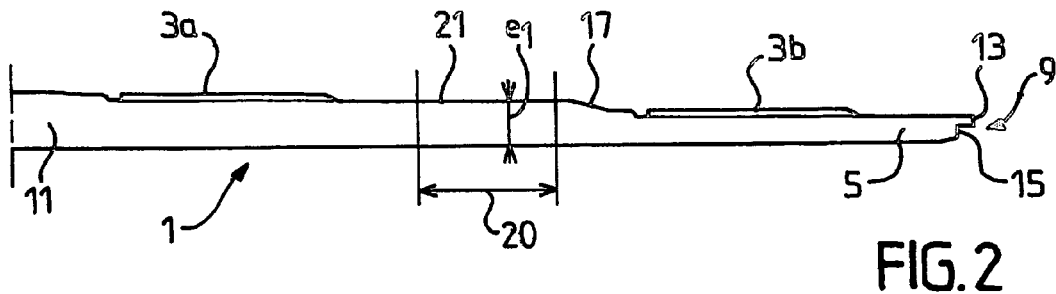

FIGS. 1 and 2 respectively show a female tubular element 2 and a male tubular element 1. Element 1 is formed at one end of a great length tube 11 and element 2 at one end of a tubular coupling 12 intended for connecting two tubes such as 11. A plurality of tubes such as 11, each of which has two threaded elements such as 1 at its two ends, can thus be connected together via couplings such as 12, each of which has two threaded elements 2 at its two ends, to form a string of tubes provided for an oil well, for example.

Element 1 has a male cylindrical threading separated into two portions 3a, 3b separated from each other in the axial direction. Portion 3a is furthest from the free end of the element 1 and has greater diameter than portion 3b, which is closest to the free end. Similarly, female element 2 has a female cylindrical threading in two portions 4a and 4b which respectively match portions 3a and 3b of the male threading, portion 4a extending almost to the free end of the female element 2.

Portion 3b of the male threading is extended from the male free end side by a male lip 5 having a peripheral surface 7 facing radially outwardly.

In correspondence with the male element, the female element has a female housing having a peripheral surface 8 facing radially inwardly.

The free end 9 of the element 1 is formed by an axially projecting tongue 13 and by a transverse surface 15, which is set back with respect to the tongue 13, which transverse surface 15 extends between the tongue and the internal peripheral surface of element 1. Female element 2 has an annular surface 10 that matches the end surface 9 of the element 1, formed by a groove 14 that can receive the tongue 13 and a transverse surface 16 that can cooperate with the surface 15. Surfaces 9 and 10 come into mutual abutting contact to limit makeup of the two tubular elements. Their nesting and disposition with a small clearance of surfaces 7, 8 can guarantee sealing of the threaded connection prior to expansion, and after expansion when the degree thereof does not exceed about 15%. Complementary information on the configuration of these surfaces and their behaviour during and after expansion can be found in WO-A-02/01102.

Figure 3:
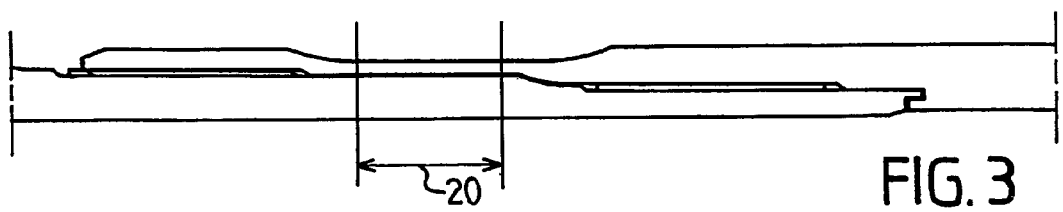
FIG. 3 is an analogous view to FIGS. 1 and 2, showing the two tubular elements at the end of mutual makeup.

FIG. 3 shows elements 1 and 2 connected by making up until the faces of abutments 9 and 10 come into mutual bearing contact, the threading portions 3a and 3b being made up into threading portions 4a and 4b respectively.

In accordance with the invention, in a zone 20 of its length included between threading portions 4a and 4b, the female element 2 has a uniform external diameter which is less than its external diameter facing threading portions 4a and 4b, and an internal diameter that is also uniform, resulting in a constant radial thickness e, smaller than its radial thickness in the area of the threading portions in a corresponding zone 20, male element 1 has a constant external diameter that is substantially equal to the internal diameter of element 2, such that the two elements adjust under mild friction in zone 20. In transition zones 23, 24 located axially either side of zone 20, the radial thickness of element 2 and its external diameter increase progressively with distance from zone 20.

The term "mild friction" means a small clearance between the cylindrical surfaces 21, 22, for example of the order of 0.25 mm in diameter.

Such a disposition of surfaces 21, 22 can avoid any risk of galling of said surfaces during makeup; galling at this stage would run the risk of subsequently preventing the production of a sealed contact between surfaces 21 and 22.

It should be noted that along the zone 20, thickness $e_2$ of the female element is substantially less than the thickness $e_1$ of the male element.

In accordance with a complementary advantageous characteristic of the invention, the surface of the male element facing radially outwardly has, between the surface 21 and the threading portion 3*b*, a tapered surface 17 which mates with a tapered surface 18 interposed between the surface 22 and the threading portion 4*b* on the face of the female element facing radially inwardly. A radial cone-cone interference fit between surfaces 17 and 18 at the end of makeup also provides a seal prior to expansion. This seal does not have to subsist after expansion.

Other forms are possible for surfaces 17 and 18, for example a domed surface 17 and a tapered surface 18, as shown in FIG. 10.

Figure 4:
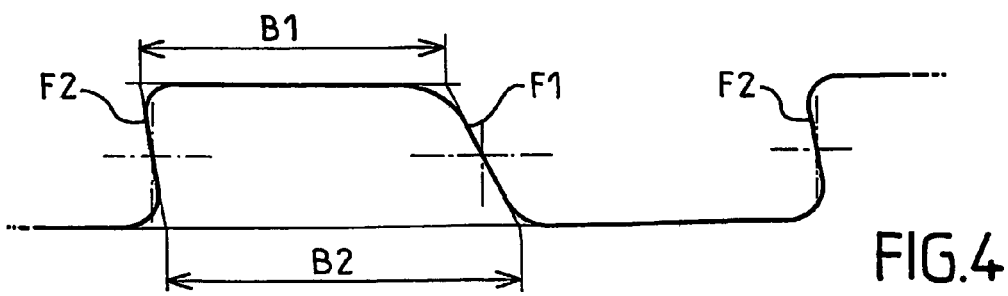
FIG. 4 shows a profile of the male threading of the male tubular element of FIG. 2.

FIG. 4 shows the trapezoidal profile of threads forming the male threading 3*a*, 3*b*. The small base B1 of the trapezoidal profile is located on the major diameter of the threading and forms the thread crests, and as a result the large base B2 is located on the minor diameter and forms the thread base. The two flanks of each thread are inclined in the same direction, flank F1 facing towards the free end of the threaded element to which it belongs, termed the stabbing flank, and being more inclined than the other flank F2 with respect to a radial plane, this latter flank being termed the load flank as it supports the weight of the lower tube of the connection to which it belongs and the tubes located below it in the string. Flanks F1, F2 are connected to the thread crest and root via rounded portions.

The threads of female threading 4*a*, 4*b* have a similar profile; the small base of the trapezium is on the minor diameter of the threading and the large base is on the major diameter.

Figure 5:
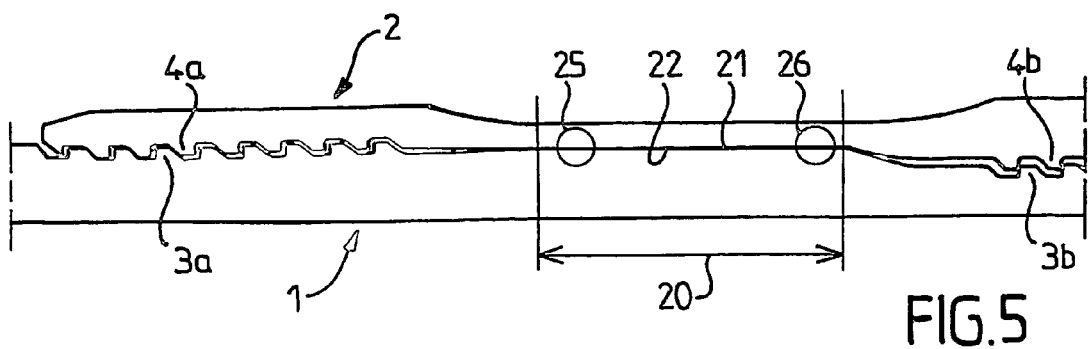
FIG. 5 is an axial cross sectional half view of a threaded tubular connection of the invention obtained from the elements of FIGS. 1 and 2.

FIG. 5 shows the threaded connection after radial expansion to an amount of 25%. It can be shown by determining contact pressures completed by sealing tests under service conditions that a sealing contact by a mutual radial interference fit of surfaces 21 and 22 is established in two annular areas 25 and 26 of zone 20, separated from each other in the axial direction.

The contact pressures between the surfaces 21 and 22 result from higher spring back displacement in the female element than in the male element after expansion.

In the case of the implementation of FIG. 5, the higher spring back displacement of the female element is obtained by the reduced thickness $e_2$ of the female element in the contact zone 2 with respect to the thickness of the female element in the area of the threading portions 4*a* and 4*b*, thickness $e_2$ thus being substantially smaller than the corresponding thickness $e_1$ on the male element.

In this implementation, optimum effects on the contact pressure are obtained when the ratio $e_2/e_1$ is neither too high (as the difference in female/male spring back displacement would not be sufficient) nor too low (insufficient mechanical strength); hence the preferred choice of $e_2/e_1$ in the range 0.25 to 0.7, more preferably in the range 0.35 to 0.5.

Similarly, to optimize the service behaviour, it is advantageous for the ratio between $e_1$ and the thickness of the tube to be neither too high (>0.8) nor too small (<0.4).

The table below shows characteristic values for the contact pressure calculated by finished element analysis (FEA) under the following conditions:

| | |
|---|---|
| external diameter of tubes: | 193.7 mm (7" ⅝); |
| tube thickness ($e_t$) | 9.53 mm (29.7 lb/ft); | threaded tubular connection comprising a "left" and "right" connection, the ball displacing during expansion from the left to the right connection:

| | |
|---|---|
| thickness $e_2$: | 2.61 mm; |
| thickness $e_1$: | 6.97 mm; |
| hence $e_2/e_1$ = | 0.37; |
| $e_1/e_t$ = | 0.73; |
| length of zone 20: | about 25 mm; |
| degree of expansion: | 25%; | same materials for tubes and coupling.

The contact pressure, calculated between the surfaces 21-22 (central seal), was integrated along the width of the contact and the values below are values for this integral, in N/mm.

| | Central seal (N/mm) | |
|---|---|---|
| | Annular area 25 | Annular area 26 |
| Left connection | 181 | 100 |
| Right connection | 281 | 87 |

The values obtained for the central seal are excellent, whether the ball is displaced from the male element towards the female element (left connection) or from the female element towards the male element (right connection), despite an expansion of 25%.

In a further implementation, the higher spring back displacement of the female element with respect to the male element can be increased using a coupling 12 formed from a material with a Young's modulus E that is lower than that of tubes 11 and/or formed from a material treated so as to have a higher yield strength than that of tubes 11.

Thus, treated steel tubes can be used for a yield strength of 550 MPa and treated titanium alloy couplings for a yield strength of 680 MPa, the Young's modulus of titanium alloys being of the order of 60% that of steels.

Such use of materials can have a significant technical effect on contact pressures for $e_2/e_1$ values that are higher than those in the preferred range.

In a variation shown in FIG. 13, rather than have a coupling formed from a material that differs from tubes with a substantial thickness $e_2$, a relatively small thickness $e_2$ can be retained so that $e_2/e_1$ is in the range 0.25 to 0.7, but the available space externally of the external peripheral surface of the coupling facing the reduced thickness zone can be filled to a greater or lesser extent by refilling, for example by depositing filler material by welding, formed from a material with a low Young's modulus and/or a high yield strength.

A refilling formed from a hard abrasion-resistant material can be envisaged, for example. Alternatively, a ring 28 can be inserted formed from such materials, over the reduced thickness zone outwardly thereof; see FIG. 14. The ring can be split or shrunk on.

Figure 6:
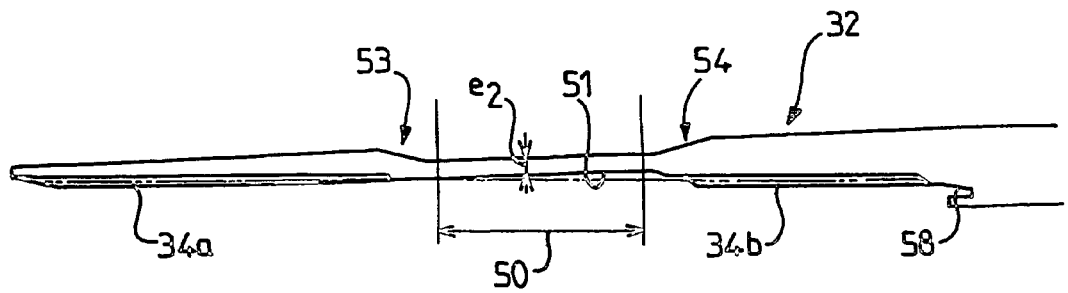
FIGS. 6 and 7 are analogous views to FIGS. 1 and 2 respectively, relating to a further implementation of the invention.
Figure 7:
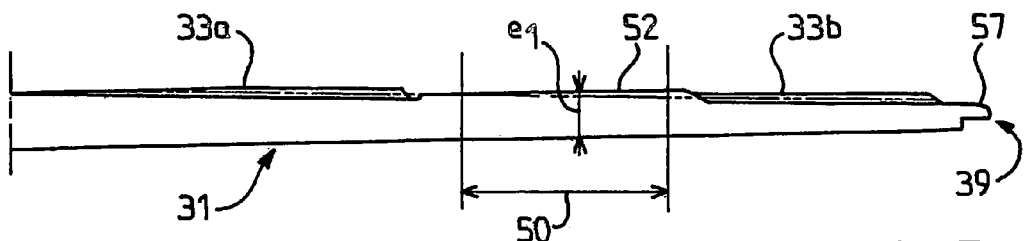

FIGS. 6 and 7 are analogous views to FIGS. 1 and 2, showing tubular elements with tapered threadings. The thread roots and crests of the threading portions 33*a* and 33*b* of the male element 31 are located on common tapered surfaces, and similarly for the threading portions 34a and 34b of the female element 32. Opposite to the free end 39 of element 31, threading portion 33a comprises vanishing or run out threads, i.e. with heights that reduce progressively to zero.

In variations that are not shown, the two portions of each threading are disposed on distinct tapered surfaces, having the same or different tapers.

In a contact zone 50 located between the threading portions 34a and 34b, the female element 32 has a radial thickness $e_2$ defined by a smooth cylindrical internal peripheral surface 51 and a cylindrical external peripheral surface with a reduced diameter with respect to the external diameter of the element 32 in the area of the threading portions 34a and 34b. The thickness $e_2$ is thus lower than the radial thickness $e_1$ of the male element 31 in zone 50 and than the radial thickness of element 32 in the area of the threading portion 34b and in the area of the threading portion 34a, at least in the region thereof that is closest to zone 50, the thickness of element 32 reducing progressively in the direction of the free end thereof because of the taper of the threading portion 34a. In transition zones 53, 54 located axially either side of zone 50, the radial thickness of element 32 and its external diameter increase progressively.

FIG. 7 shows that, in contact zone 50 of the threaded connection, the male element 31 has a smooth cylindrical inner peripheral surface similar to surface 22 of FIG. 2.

In this implementation, the role of surfaces 17 and 18 in FIGS. 1 and 2 is played by a male tapered conical surface 57 adjacent to the free end 39 of the male element and by a matching female tapered conical surface 58 located beyond the threading portion 34b with respect to the free end of the female element.

Figure 8:
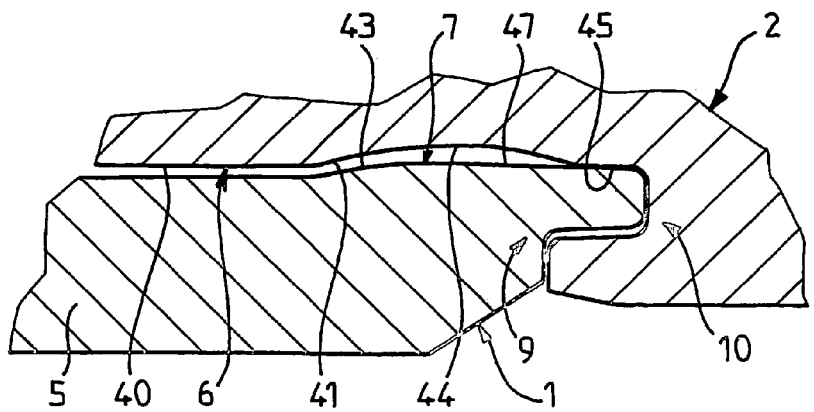
FIG. 8 is a partial view on a larger scale of a variation of the assembly of FIG. 3.

In the variation of FIG. 8, the inwardly radially facing peripheral surface of the female housing comprises an annular channel 44 having a concave profile that is formed substantially as an arc of a circle with a radius of about 10 mm, which is connected on the side of the second axial abutment surface 10 to a first portion of peripheral wall 45 and on the opposite side to a second portion of a peripheral wall 40 that is substantially of the same diameter as the wall portion 45, the flank of the channel 44 on the second portion of peripheral wall side defining an inclined shoulder 41.

In this same variation, the peripheral surface 7 of the male lip 5 facing radially outwardly comprises a cylindrical portion 47 disposed between an inclined shoulder 43 and the first surface of the axial abutment 9. The space between the base of the channel 44 and the cylindrical portion 47 and the clearances allow the proper evacuation of grease during makeup.

During expansion of the connection, the concave form of the channel 44 impresses a corresponding convex form into the peripheral surface 7 of the lip.

Radial expansion causes axial deformation causing a relative displacement of the inclined shoulder 41 of the housing and the inclined shoulder 43 of the lip. The direction of axial expansion is of no matter, the contact between inclined shoulders 41 and 43 resulting either from closing of the inclined shoulder of the housing against the inclined shoulder 43 of the lip or vice versa, from closing of the inclined shoulder 43 of the lip against the inclined shoulder 41 of the housing.

Thus, the radial deformation of the expansion caused axial deformation of the lip 5 and housing 6. The inclined shoulder 43 of the lip comes into contact at least one point with the inclined shoulder 41 of the housing, or vice versa. This sealing contact remains stable even under tension. It is reinforced when the degree of expansion increases.

The channel impresses in the male lip a local curvature that is greater and tends to encourage contact between the tongue 13 and the flank of the groove 14. This contact locks and stabilizes the behaviour of the lip under the substantially inner pressure of a fluid.

Figure 9:
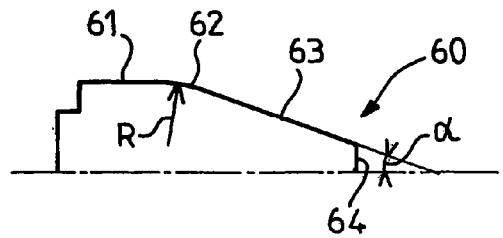
FIG. 9 is a half-view of a ball for use in expanding the connection in the method of the invention.

FIG. 9 is a half-view of an expansion tool or ball that is known per se, advantageously for use in the method of the invention. Ball 60 has a cylindrical region 61 the diameter of which is selected as a function of the desired degree of expansion, which is connected via a rounded portion 62 to a tapered region 63, which latter extends to the radial end face 64. The diameter of the end face 64, which constitutes the small base of the tapered region 63, is smaller than the initial internal diameter of the tubular elements, which allows the ball to be engaged therein via end 64, the internal diameter of the tubular elements being progressively increased by advance of region 63. A detailed explanation of the action of the ball can be found in WO-A-02/01102.

Advantageously, the radius R of the rounded portion 62 is in the range 1.27 to 6.35 cm, and the peak half-angle $\alpha$ of the tapered region is about 10°.

Although the connection of the invention has been described above as being formed between a great length tube and a coupling (coupled connection), the invention is also applicable to a connection formed between two great length tubes and in particular an integral connection formed in great length tubes, for example by forging, or to a connection constituted by elements fastened to tubes, for example by welding. Further, the axial abutment surfaces of the threaded elements can have other forms than those described with a tongue and groove.

In the case of an integral connection, apart from substantially thickening up the ends of tubes by forging, which is expensive, the tube thickness may prove to be insufficient for producing a connection of the type shown in FIG. 3.

This means that the female axial abutment must then be removed. FIGS. 11 and 12 show such a variation of FIG. 3 and uses the same reference numerals to designate elements identical to those in FIGS. 1 and 2, in particular the straight threading portions 3a, 3b, 4a, 4b, and the contact zone 20 located between the threading portions in which the female element has a reduced thickness $e_2$, to establish sealing contact by radial interference after expansion between surfaces 21 and 22.

Because of the absence of a female abutment surface, it is not then possible to determine the end of makeup by an abrupt rise in the makeup torque, as occurs when bringing the axial abutments of connections having such abutments into abutment.

However, it is possible to define the end of makeup on a connection with no axial abutment by bringing reference marks on the outside of the male and female elements into alignment, in known manner.

Clearly, the absence of a female abutment results in an absence of a sealing contact after expansion between the outwardly facing peripheral surface of the lip 75 and that of the inwardly facing female element.

The threaded connections obtained by the method of the invention are particularly suitable for drilling and well working comprising only a single string of casings or liners, while the conventional expansion-free technique involves placing a plurality of concentric columns, depending on the depths to be reached.

The invention claimed is:
1. A method for producing a sealed threaded tubular connection starting from an initial threaded tubular connection including a first male tubular element including a first male threading and a second female tubular element including a second female threading, homologous with the first threading, the method comprising:
  making the first threading up into the second threading to bring the first and second elements into a connected position; and
  subjecting the initial threaded tubular connection to a diametral expansion in a region of plastic deformation using an expansion tool with a diameter that is greater than an internal diameter of the tubular elements, which is axially displaced in the connection,
  wherein each of the first and second threadings is separated into two portions separated from each other in an axial direction and, in a contact zone extending over a fraction of the length of the connection included between the threading portions, the male and female elements have smooth surfaces facing radially outwardly and inwardly respectively, which fit into one another over an entire axial length of the contact zone during the making up, a mechanism being provided to endow the female element in the contact zone with a spring back displacement after expansion that is greater than that of the male element, to establish a local sealed contact by a radial interference fit between the smooth surfaces, and
  wherein the spring back displacement mechanism is not provided by a ring inserted over the contact zone.

2. The method according to claim 1, wherein the smooth surfaces are cylindrical and slide freely in one another.

3. The method according to claim 1, wherein radial thickness of the female element and the male element is constant over the entire length of the contact zone.

4. The method according to claim 1, wherein diametral clearance between the smooth surfaces is in a range of 0.1 to 0.8 mm.

5. The method according claim 1, wherein the sealing contact by a radial interference fit is established in at least two annular areas distributed over the contact zone.

6. The method according to claim 1, wherein radial thickness of the female element in the contact zone is reduced with respect to its thickness in the area of the threading portions.

7. The method according to claim 6, wherein the radial thickness of the female element increases progressively in two transition zones located respectively on either side of the contact zone.

8. The method according to claim 6, wherein the reduced thickness zone of the female element is at least partially filled with a material having a lower Young's modulus and/or a higher yield strength than the female element.

9. The method according to claim 6, wherein the reduced thickness zone of the female element is surrounded by a ring formed from a material with a lower Young's modulus and/or a higher yield strength than the female element.

10. The method according to claim 1, wherein a ratio between a minimum radial thickness of the female element in the contact zone and radial thickness of the area of the male element facing an area of minimum radial thickness of the female element in the contact zone is in a range of 0.25 to 0.7.

11. The method according to claim 10, wherein the ratio is in a range of 0.35 to 0.5.

12. The method according to claim 1, wherein the first tubular element and the second tubular element respectively form part of a first great length tube and to a coupling configured to connect the first great length tube to a second great length tube via a second threaded tubular connection.

13. The method according to claim 12, wherein the coupling is formed from a material that differs from that of the great length tube by having a lower Young's modulus and/or a higher yield strength.

14. The method according to claim 1, wherein the first tubular element and the second tubular element respectively belong to two great length tubes.

15. The method according to claim 12, wherein a ratio between the radial thickness of the male element in the contact zone and radial thickness of the great length tubes over a majority of their length is in a range of 0.4 to 0.8.

16. The method according to claim 1, wherein the male and female tubular elements respectively have first and second axial abutment surfaces which come into mutual contact at the end of the making up.

17. The method according to claim 16, wherein the first tubular element has at a free end an annular lip having the first axial abutment surface constituted by an annular tongue and by a transverse surface adjacent to the tongue and axially set back with respect thereto, connected to an internal peripheral surface of the first element, and the second tubular element has a housing, homologous with the male lip, having the second axial abutment surface constituted by an annular groove and by a transverse surface adjacent thereto, connected to the internal peripheral surface of the second element, the tongue cooperating with the groove.

18. The method according to claim 17, wherein an inwardly radially peripheral facing surface of the housing comprises an annular channel with a concavely arched profile, which has a first flank facing axially towards the axial abutment surfaces and a second flank facing axially opposite to the axial abutment surfaces, an inclined shoulder of the housing, defined by the first flank, and an inclined shoulder facing axially opposite to the axial abutment surfaces, formed on the peripheral surface of the radially outwardly facing male lip, undergoing an axial displacement relative to each other during radial expansion to come into mutual sealing contact with the radial interference fit.

19. The method according to claim 1, wherein the first and second threadings are tapered with a taper of at most 12.5%.

20. The method according to claim 19, wherein the threading portions of each element are located along a common tapered surface.

21. The method according to claim 1, wherein the first and second threadings are straight, the two portions of each threading having different diameters.

22. The method according to claim 1, wherein mating surfaces are provided on the male and female elements to ensure a sealing contact by the radial interference fit between the mating surfaces prior to expansion.

23. The method according to claim 22, wherein the mating surfaces are located in a vicinity of a free end of the male element.

24. The method according to claim 22, wherein each mating surface is located between (i) the contact zone and (ii) a threading portion that has a smallest diameter of the two portions of the respective first or second threadings.

25. The method according to claim 1, wherein the degree of expansion is in a range of 10% to 30%.

26. The method according to claim 1, wherein the degree of expansion is in a range of 15% to 25%.

* * * * *